US011395359B2

(12) United States Patent
Cao et al.

(10) Patent No.: US 11,395,359 B2
(45) Date of Patent: Jul. 19, 2022

(54) SIMULTANEOUS TRANSMISSION OF DATA UNITS IN MULTIPLE FREQUENCY SEGMENTS

(71) Applicant: Marvell Asia Pte, Ltd., Singapore (SG)

(72) Inventors: Rui Cao, Fremont, CA (US);
Hongyuan Zhang, Fremont, CA (US);
Sudhir Srinivasa, Los Gatos, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 16/847,092

(22) Filed: Apr. 13, 2020

(65) Prior Publication Data

US 2020/0329519 A1    Oct. 15, 2020

Related U.S. Application Data

(60) Provisional application No. 62/832,764, filed on Apr. 11, 2019.

(51) Int. Cl.
| | | |
|---|---|---|
| *H04W 76/15* | (2018.01) |
| *H04L 1/06* | (2006.01) |
| *H04L 1/00* | (2006.01) |
| *H04W 80/02* | (2009.01) |

(52) U.S. Cl.
CPC ........... *H04W 76/15* (2018.02); *H04L 1/0003* (2013.01); *H04L 1/0606* (2013.01); *H04W 80/02* (2013.01)

(58) Field of Classification Search
None
See application file for complete search history.

(56) References Cited

U.S. PATENT DOCUMENTS

| 10,966,200 B2 * | 3/2021 | Chu ...................... H04W 28/20 |
| 10,966,227 B2 * | 3/2021 | Zhang ................... H04L 1/1685 |
| 2011/0255620 A1 | 10/2011 | Jones, IV et al. |

(Continued)

FOREIGN PATENT DOCUMENTS

| EP | 2028809 A2 | 2/2009 |
| EP | 2999252 A1 | 3/2016 |

(Continued)

OTHER PUBLICATIONS

International Search Report and Written Opinion in International Patent Application No. PCT/US2020/027975, dated Aug. 6, 2020 (13 pages).

(Continued)

*Primary Examiner* — Anh Vu H Ly

(57) ABSTRACT

A first aggregated MAC protocol data unit (A-MPDU) is generated for transmission over a first frequency segment of a communication channel, and a second A-MPDU is generated for transmission over a second frequency segment of the communication channel. A PHY protocol data unit (PPDU) is generated to include the plurality of A-MPDUs and a second PPDU is generated to include the second A-MPDU. A first transmit processor generates a first RF signal for transmission of the first PPDU over the first frequency segment and a second transmit processor generates a second RF signal for transmission of the second PPDU over the second frequency segment. The first RF signal is transmitted in the first frequency segment simultaneously with the second RF signal being transmitted in the second frequency segment.

20 Claims, 7 Drawing Sheets

(56) References Cited

U.S. PATENT DOCUMENTS

| | | | |
|---|---|---|---|
| 2012/0028671 A1* | 2/2012 | Niu | H04B 7/0452 |
| | | | 455/522 |
| 2013/0229996 A1 | 9/2013 | Wang et al. | |
| 2016/0134406 A1 | 5/2016 | Chu et al. | |
| 2017/0311204 A1 | 10/2017 | Cariou et al. | |
| 2019/0045508 A1* | 2/2019 | Cariou | H04W 72/0446 |
| 2019/0182714 A1 | 6/2019 | Chu et al. | |
| 2019/0182863 A1 | 6/2019 | Chu et al. | |

FOREIGN PATENT DOCUMENTS

| | | |
|---|---|---|
| WO | WO-2006/000955 | 1/2006 |
| WO | WO-2012/026779 A2 | 3/2012 |
| WO | WO-2015/099803 | 7/2015 |
| WO | WO-2017/026937 A1 | 2/2017 |

OTHER PUBLICATIONS

IEEE Std 802.11™ 2012 (Revision of IEEE Std 802.11-2007) IEEE Standard for Information technology—Telecommunications and Information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE P802.11ax™/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).

Zhang et al., "EHT Technology Candidate Discussions," doc: IEEE 802.11-18/1161r0, The Institute of Electrical and Electronics Engineers, Inc., pp. 1-10 Jul. 8, 2018.

Orfanos et al., "A New Distributed Coordination Function for W-LANs with Multiple Channel Structure," Proceedings of the 14th 1st Mobile and Wireless Communications Summit; Dresden, Germany, 5 pages (Jun. 19, 2005).

\* cited by examiner

SIMULTANEOUS TRANSMISSION OF DATA UNITS IN MULTIPLE FREQUENCY SEGMENTS

CROSS REFERENCES TO RELATED APPLICATIONS

This application claims the benefit of U.S. Provisional Patent Application No. 62/832,746, entitled "Extra High Throughput (EHT) Aggregated PLCP Protocol Data Unit (PPDU) Parsing," filed on Apr. 11, 2019, which is hereby incorporated herein by reference in its entirety.

FIELD OF TECHNOLOGY

The present disclosure relates generally to wireless communication systems, and more particularly to data transmission and reception over multiple frequency segments of a communication channel.

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data rates. One way in which data rates have been increased is by increasing the frequency bandwidth of communication channels used in WLANs. For example, the IEEE 802.11n Standard permits aggregation of two 20 MHz sub-channels to form a 40 MHz aggregate communication channel, whereas the more recent IEEE 802.11ax Standard permits aggregation of up to eight 20 MHz sub-channels to form up to 160 MHz aggregate communication channels.

Work has now begun on a new iteration of the IEEE 802.11 Standard, which is referred to as the IEEE 802.11be Standard, or Extremely High Throughput (EHT) WLAN. The IEEE 802.11be Standard may permit aggregation of multiple sub-channels in different frequency segments (for example, separated by a gap in frequency) to form a single aggregate channel. Further, the IEEE 802.11be Standard may permit aggregation of multiple sub-channels in different radio frequency (RF) bands to form a single aggregate channel.

SUMMARY

In an embodiment, a method for simultaneous transmission of data over a plurality of frequency segments of a communication channel includes: generating, at one or more synchronized control (MAC) processors implemented on one or more integrated circuit (IC) devices, a plurality of aggregated MAC protocol data units (A-MPDUs) for transmission over the plurality of frequency segments, including generating at least a first A-MPDU for transmission over a first frequency segment among the plurality of frequency segments and a second A-MPDU for transmission over a second frequency segment among the plurality of frequency segments; providing, with the one or more synchronized MAC processors, the plurality of A-MPDUs to one or more physical layer (PHY) processors implemented on the one or more IC devices, the one or more PHY processors including at least a first transmit processor corresponding to the first frequency segment and a second transmit processor corresponding to the second frequency segment; generating, with the one or more PHY processors, a plurality of PHY protocol data units (PPDUs) to include the plurality of A-MPDUs, including i) generating a first data portion of a first PPDU to include the first A-MPDU and ii) generating a second data portion of a second PPDU to include the second A-MPDU; generating, with the one or more PHY processors, a plurality of radio frequency (RF) signals for transmission over the plurality of frequency segments, including i) generating, with the first transmit processor, a first RF signal for transmission of the first PPDU over the first frequency segment and ii) generating, with the second transmit processor, a second RF signal for transmission of the second PPDU over the second frequency segment; and transmitting, with the one or more PHY processors, the plurality of RF signals, including transmitting the first RF signal in the first frequency segment simultaneously with transmitting the second RF signal in the second frequency segment.

In another embodiment, a communication device comprises: a wireless network interface device implemented on one or more integrated circuit (IC) devices; one or more synchronized media access control (MAC) processors implemented on the one or more IC devices, the one or more synchronized MAC processors configured to generate a plurality aggregated MAC protocol data units (A-MPDUs) for transmission over a plurality of frequency segments of a communication channel, including at least a first A-MPDU for transmission over a first frequency segment among the plurality of frequency segments and a second A-MPDU for transmission over a second frequency segment among the plurality of frequency segments; and one or more physical layer (PHY) processors implemented on the one or more IC devices, the one or more PHY processors, the one or more PHY processors comprising at least a first transmit processor corresponding to the first frequency segment and a second transmit processor corresponding to the second frequency segment. The one or more IC devices are configured to: generate a plurality of PHY protocol data units (PPDUs) to include the plurality of A-MPDUs generated by the one or more MAC processors, including i) generating a first data portion of a first PPDU to include the first A-MPDU and ii) generating a second data portion of a second PPDU to include the second A-MPDU; generate a plurality of RF signals for transmission over the plurality of frequency segments, including i) generating, with the first transmit processor, a first RF signal for transmission of the first PPDU over the first frequency segment and ii) generating, with the second transmit processor, a second RF signal for transmission of the second PPDU over the second frequency segment; and transmit the plurality of RF signals, including transmitting the first RF signal in the first frequency segment simultaneously with transmitting the second RF signal in the second frequency segment.

DETAILED DESCRIPTION

A next generation wireless local area network (WLAN) protocol (e.g., the IEEE 802.11be Standard, sometimes referred to as the Extremely High Throughput (EHT) WLAN Standard) may permit simultaneous transmissions in different channel segments. The different channel segments may be in a single radio frequency (RF) band or in different RF bands. The different channel segments may have a same bandwidth or different bandwidths.

Described herein are various embodiments of techniques for generating data units for simultaneous transmission over multiple frequency segments in a same or different radio RF bands. In an embodiment, a media access control (MAC) layer of a communication device generates multiple MAC data units for simultaneous transmission over the multiple frequency segments. The multiple MAC data units are then individually processed in a physical (PHY) layer of the communication device, to generate multiple PHY data units for transmission over respective ones of the multiple frequency segments. Individually processing multiple MAC data units to generate multiple PHY data units for transmission over respective ones of the multiple frequency segments allows for different PHY parameters, such as frequency bandwidth, modulation and coding scheme (MCSs), number of spatial or space-time streams (Nss), etc., to be used for transmission in respective ones of the frequency segments. Different PHY parameters may be selected for transmission in different frequency segments based on, for example, amounts of frequency bandwidth available for transmission in the frequency segments, channel characteristics of the frequency segments, etc., in various embodiments. Using different PHY parameters for transmission of respective MAC data units in different frequency segments results in more efficient use of available RF spectrum in the different frequency segments, more robust transmission in respective ones of the frequency segments, etc., as compared to systems that are constrained to using same PHY parameters for simultaneous transmission in multiple frequency segments, in at least some embodiments.

Figure 1:
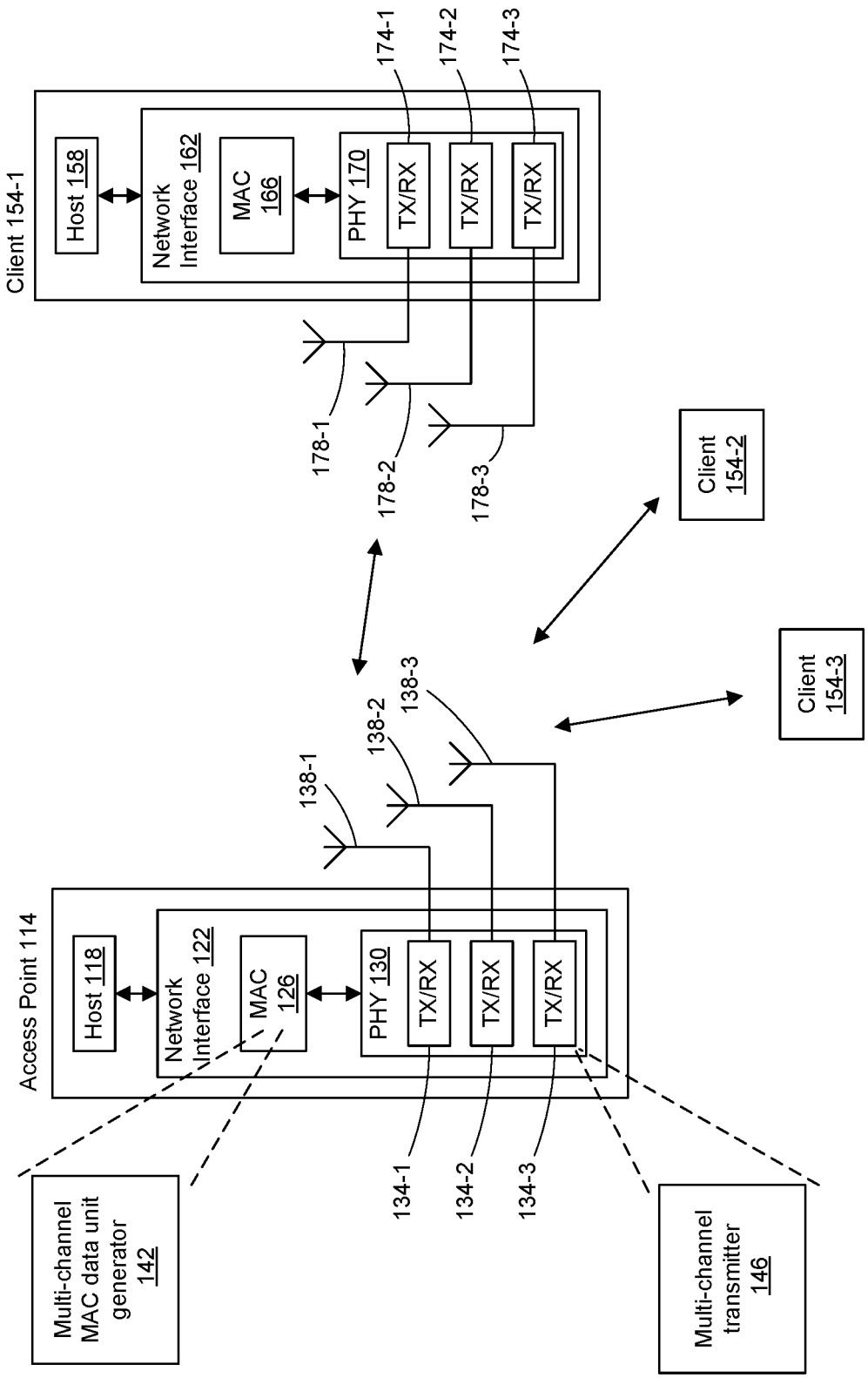
FIG. 1 is a block diagram of an example wireless local area network (WLAN) in which respective radio frequency (RF) signals are simultaneously transmitted in respective frequency segments of a communication channel.

FIG. 1 is a diagram of an example WLAN 110, according to an embodiment. The WLAN 110 includes an access point (AP) 114 that comprises a host processor 118 coupled to a wireless network interface device 122. The wireless network interface device 122 includes one or more medium access control (MAC) processors 126 (sometimes referred to herein as "the MAC processor 126" for brevity) and one or more PHY processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

In an embodiment, the wireless network interface device 122 is configured for operation within a single RF band at a given time. In an embodiment, the wireless network interface device 122 is configured to transmit and receive via respective frequency sub-channels in a communication channel within a single RF band. In an embodiment, the respective frequency sub-channels within the single RF band are separated from each other by a frequency gap. In another embodiment, the wireless network interface device 122 is additionally configured for operation within two or more RF bands at the same time or at different times. In an embodiment, the wireless network interface device 122 includes multiple PHY processors 130, where respective PHY processors 130 correspond to respective frequency segments within a single RF band and/or within respective RF bands. In another embodiment, the wireless network interface device 122 includes a single PHY processor 130, where each transceiver 134 includes respective RF radios corresponding to respective frequency segments within a single RF band and/or within respective RF bands.

The wireless network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. The first IC and the second IC may be packaged together in a single IC package thereby forming a modular device, or the first IC and the second IC may be coupled together on a single printed board, for example, in various embodiments. As another example, at least a portion of the MAC processor 126 and at least a portion of the PHY processor 130 may be implemented on a single IC. For instance, the wireless network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the wireless network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. MPDUs and A-MPDUs exchanged between the MAC processor 126 and the PHY processor 130 are sometimes referred to as physical layer convergence procedure (PLCP) (or simply "PHY") service data units (PSDUs).

The PHY processor 130 may be configured to receive MAC layer data units from the MAC processor 126 and to encapsulate the MAC layer data units to generate PHY data units such as PHY protocol data units (PPDUs) for transmission via the antennas 138. Similarly, the PHY processor 130 may be configured to receive PHY data units that were received via the antennas 138, and to extract MAC layer data units encapsulated within the PHY data units. The PHY processor 130 may provide the extracted MAC layer data units to the MAC processor 126, which processes the MAC layer data units.

PHY data units are sometimes referred to herein as "packets", and MAC layer data units are sometimes referred to herein as "frames".

In connection with generating one or more RF signals for transmission, the PHY processor 130 is configured to process (which may include modulation, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulation, filtering, etc.) the one or more digital baseband signals to generate a PPDU.

The PHY processor 130 includes amplifiers (e.g., a low noise amplifier (LNA), a power amplifier, etc.), an RF downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc., in various embodiments.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example, by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In other embodiments, the MAC processor 126 additionally or alternatively includes one or more hardware state machines.

The MAC processor 126 includes, or implements, a multi-channel MAC data unit generator 142 that is configured to generate MAC data units for transmission over multiple frequency sub-channels of a communication channel. In an embodiment, the multi-channel data unit generator 142 is configured to generate respective MAC data units, such as respective aggregate MAC data units (A-MPDUs), corresponding to respective frequency sub-channels among the multiple frequency sub-channels. Generating respective MAC data units corresponding to respective frequency sub-channels allows the PHY processor 130 to utilize different PHY parameters, such as modulation and coding scheme (MCS), number of spatial streams, etc., for generating respective PHY data units for transmission via the respective ones of the multiple frequency sub-channels. In other embodiments, the multi-channel data unit generator 142 is configured to generate a single MAC data unit, such a single A-MPDU, for transmission over the multiple frequency sub-channels of the communication channel, and the single A-MPDU may then be parsed at the PHY processor 130 into respective portions for transmission over respective ones of the multiple sub-channels.

In an embodiment, the multi-channel MAC data unit generator 142 is implemented by a processor executing machine readable instructions stored in a memory, where the machine readable instructions cause the processor to perform acts described in more detail below. In another embodiment, the a multi-channel MAC data unit generator 142 additionally or alternatively comprises hardware circuity that is configured to perform acts described in more detail below. In some embodiments, the hardware circuitry comprises one or more hardware state machines that are configured to perform acts described in more detail below.

The PHY processor 130 includes, or implements, a multi-channel transmit processor 146 that is configured to receive information bit streams corresponding to MAC data units generated by the MAC processor 126, and to generate transmit signals to transmit the information bit streams over multiple frequency sub-channels of a communication channel. In an embodiment, the multi-channel transmit processor 146 is configured to encode and modulate the information bit streams, and to parse the information bit streams into spatial or space-time streams (referred to herein as "spatial streams" for simplicity) for transmission in the multiple frequency sub-channels of the communication channel. In an embodiment, the multi-channel transmit processor 146 is configured to receive respective information streams corresponding to respective A-MPDUs generated by the MAC processor 126 for transmission over the multiple frequency sub-channels of the communication channel, and to individually encode, modulate and parse into spatial streams respective one of the information bit streams for transmission over respective ones of the multiple frequency sub-channels of the communication channel. In an embodiment, the multiple frequency sub-channels have unequal frequency bandwidths. In another embodiment, multi-channel transmit processor 146 is configured to receive a single information bit stream corresponding to a single A-MPDU generated by the MAC processor 126, parse the information bit stream to generates respective information bit streams for transmission over respective ones of the multiple frequency sub-channels of the communication channel.

In an embodiment, the multi-channel transmit processor 146 comprises hardware circuity that is configured to perform acts described in more detail below. In some embodiments, the hardware circuity comprises one or more hardware state machines that are configured to perform acts described in more detail below.

The WLAN 110 also includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a wireless network interface device 162. The wireless network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

In an embodiment, the wireless network interface device 162 is configured for operation within a single RF band at a given time. In another embodiment, the wireless network interface device 162 is configured for operation within two or more RF bands at the same time or at different times. For example, in an embodiment, the wireless network interface device 162 includes multiple PHY processors 170, where respective PHY processors 170 correspond to respective RF bands. In another embodiment, the wireless network interface device 162 includes a single PHY processor 170, where each transceiver 174 includes respective RF radios corresponding to respective RF bands. In an embodiment, the wireless network interface device 162 includes multiple MAC processors 166, where respective MAC processors 166 correspond to respective frequency segments and/or respective RF bands. In another embodiment, the wireless network interface device 162 includes a single MAC processor 166 corresponding to the multiple RF bands.

The wireless network interface device 162 is implemented using one or more ICs configured to operate as discussed below. For example, the MAC processor 166 may be implemented on at least a first IC, and the PHY processor 170 may be implemented on at least a second IC. The first IC and the second IC may be packaged together in a single IC package thereby forming a modular device, or the first IC and the second IC may be coupled together on a single printed board, for example, in various embodiments. As another example, at least a portion of the MAC processor 166 and at least a portion of the PHY processor 170 may be implemented on a single IC. For instance, the wireless network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the wireless network interface device 162 may be implemented on a single IC.

In various embodiments, the MAC processor 166 and the PHY processor 170 of the client station 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In some embodiments, the MAC processor 166 implements a multi-channel MAC data unit generator (not shown) the same as or similar to the multi-channel MAC data unit generator 142 of the AP 114. In other embodiments, the MAC processor 166 does not include such a multi-channel MAC data unit generator. In some embodiments, the PHY processor 170 implements a multi-channel transmit processor (not shown) the same as or similar to the multi-channel transmit processor 146 of the AP 114. In other embodiments, the PHY processor 170 does not include such a multi-channel transmit processor.

In an embodiment, each of the client stations 154-2 and 154-3 has a structure that is the same as or similar to the client station 154-1. In an embodiment, one or more of the client stations 154-2 and 154-3 has a different suitable structure than the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

In an embodiment, multiple different frequency bands within the RF spectrum are employed for signal transmissions within the WLAN 110. In an embodiment, different communication devices (i.e., the AP 114 and the client stations 154) may be configured for operation in different frequency bands. In an embodiment, at least some communication devices (e.g., the AP 114 and the client station 154) in the WLAN 110 may be configured for simultaneous operation over multiple different frequency bands. Exemplary frequency bands include, a first frequency band corresponding to a frequency range of approximately 2.4 GHz-2.5 GHz ("2 GHz band"), and a second frequency band corresponding to a frequency range of approximately 5 GHz-5.9 GHz ("5 GHz band") of the RF spectrum. In an embodiment, one or more communication devices within the WLAN may also be configured for operation in a third frequency band in the 6 GHz-7 GHz range ("6 GHz band"). Each of the frequency bands comprise multiple component channels which may be combined within the respective frequency bands to generate channels of wider bandwidths, as described above. In an embodiment corresponding to multi-channel segment operation over a first channel segment and a second channel segment, the first channel segment and the second channel segment may be in separate frequency bands, or within a same frequency band. In some embodiments, at least one communication device (e.g., at least the AP 114) in the WLAN 110 is configured for simultaneous operation over any two of the 2 GHz band, the 5 GHz band, and the 7 GHz band. In some embodiments, at least one communication device (e.g., at least the AP 114) in the WLAN 110 is configured for simultaneous operation over all three of the 2 GHz band, the 5 GHz band, and the 7 GHz band.

Figure 2:
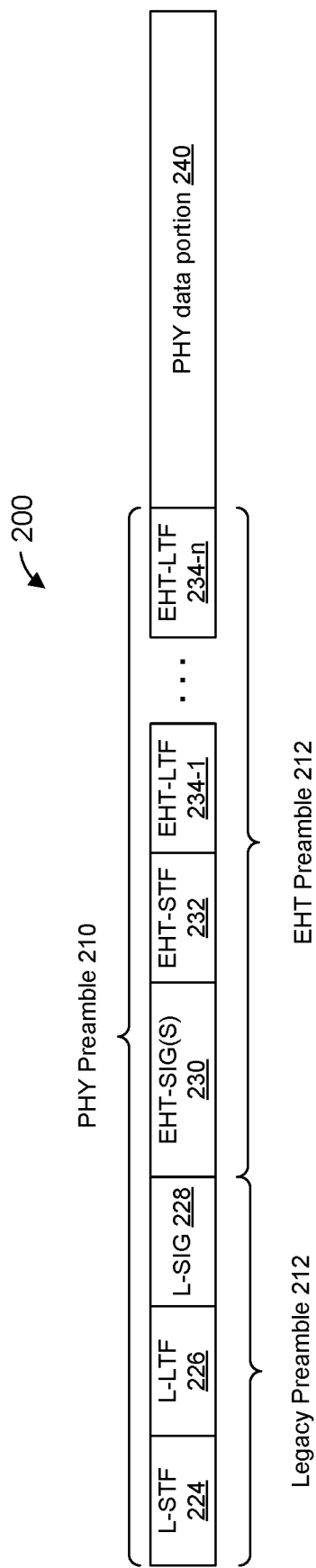
FIG. 2 is a block diagram of an example physical layer (PHY) data unit, according to an embodiment.

FIG. 2 is a diagram of an example PPDU 200, according to an embodiment. In an embodiment, the AP 114 (FIG. 1) is configured to (e.g., the network interface device 122 is configured to, the PHY processor 130 is configured to, the multi-channel transmit processor 146 is configured to, etc.) generate and transmit the PPDU 200 to one or more client stations 154. In an embodiment, the network device 122 (FIG. 1) is configured to (e.g., the network interface device 122 is configured to, the PHY processor 130 is configured to, the multi-channel transmit processor 146 is configured to, etc.) generate multiple PPDUs such as the PPDU 200, and to simultaneously transmit the multiple PPDUs in respective ones of multiple frequency segments to one or more client stations 154. In another embodiment, a client station 154 (FIG. 1) is configured to (e.g., the client station 154-1 is configured to, the network interface device 162 is configured to, the PHY processor 170 is configured to, etc.) generate and transmit one or more PPDUs such as the PPDU 200, and to simultaneously transmit the one or more PPDUs in respective ones of one or more frequency segments to the AP 114.

The PPDU 200 includes a PHY preamble 210 which, in turn, includes a legacy PHY preamble portion 212 (sometimes referred to as a legacy preamble 212), a non-legacy PHY preamble portion (e.g., an EHT preamble) 216 (sometime referred to as a EHT preamble 216), and a PHY data portion 220. The legacy preamble 212 comprises a legacy short training field (L-STF) 224, a legacy long training field (L-LTF) 228, and a legacy signal field (L-SIG) 232. In an embodiment, the STFs 224 and the LTFs 228 are used for packet detection, automatic gain control (AGC), frequency offset estimation, channel estimation, etc. The L-SIG 232 includes a rate subfield (not shown) and a length subfield (not shown) that together indicate a duration of the PPDU 200. The EHT preamble 216 includes one or more EHT signal fields 230, an EHT STF field 232 and one or more EHT LTF fields 234. The one or more EHT signal fields 230 include PHY parameters regarding the PPDU 200 that are for use by receiver devices to properly process the PPDU 200, such as a bandwidth subfield that indicates a frequency bandwidth of the PHY data portion 240 PPDU 200 of the PPDU 200, a modulation and coding scheme (MCS) subfield that indicates an MCS used for the PHY data portion 240 of the PPDU 200, a number of spatial/space-time streams (Nss) subfield that indicates a Nss used for transmission of the PHY data portion 240 PPDU 200 of the PPDU 200, etc., in an embodiment. In an embodiment, the number of the EHT LTF fields 234 correspond to a number of spatial/space-time streams used for transmission of the PPDU 200.

In an embodiment, the PPDU 200 is a multi-user (MU) orthogonal frequency division multiple access (OFDMA) data unit in which independent data streams are transmitted to multiple client stations 154 using respective sets of OFDM tones allocated to the client stations 154. For example, in an embodiment, available OFDM tones (e.g., OFDM tones that are not used as DC tone and/or guard tones) are segmented into multiple resource units (RUs), and each of the multiple RUs is allocated to data to one or more client stations 154. In an embodiment, the independent data streams in respective allocated RUs are further transmitted using respective spatial streams, allocated to the client stations 154, using multiple-input multiple-output (MIMO) techniques. In an embodiment, the PPDU 200 is an MU-MIMO PHY data unit in which independent data streams are transmitted to multiple client stations 154 using respective spatial streams allocated to the client stations 154.

In an embodiment, the PPDU 200 has a 20 MHz frequency bandwidth and is transmitted in a 20 MHz channel. In other embodiments, the PPDU 200 may have a frequency bandwidth of 40 MHz, 80 MHz, 100 MHz, 120 MHz, etc., and is correspondingly transmitted over a 40 MHz, 80 MHz, 100 MHz, 120 MHz, etc., channel, respectively. In some such embodiments, at least a portion of the PPDU 200 (e.g., at least the PHY preamble 212, or the entirety of the PHY preamble 210) is generated by generating a field corresponding to a 20 MHz component channel bandwidth and repeating the field over a number of 20 MHz component channels corresponding to the transmission channel, in an embodiment. For example, in an embodiment in which the PPDU 200 occupies an 80 MHz channel, at least the legacy preamble 212 corresponding to the 20 MHz component channel bandwidth is replicated in each of four 20 MHz component channels that comprise the 80 MHz channel.

Figure 3:
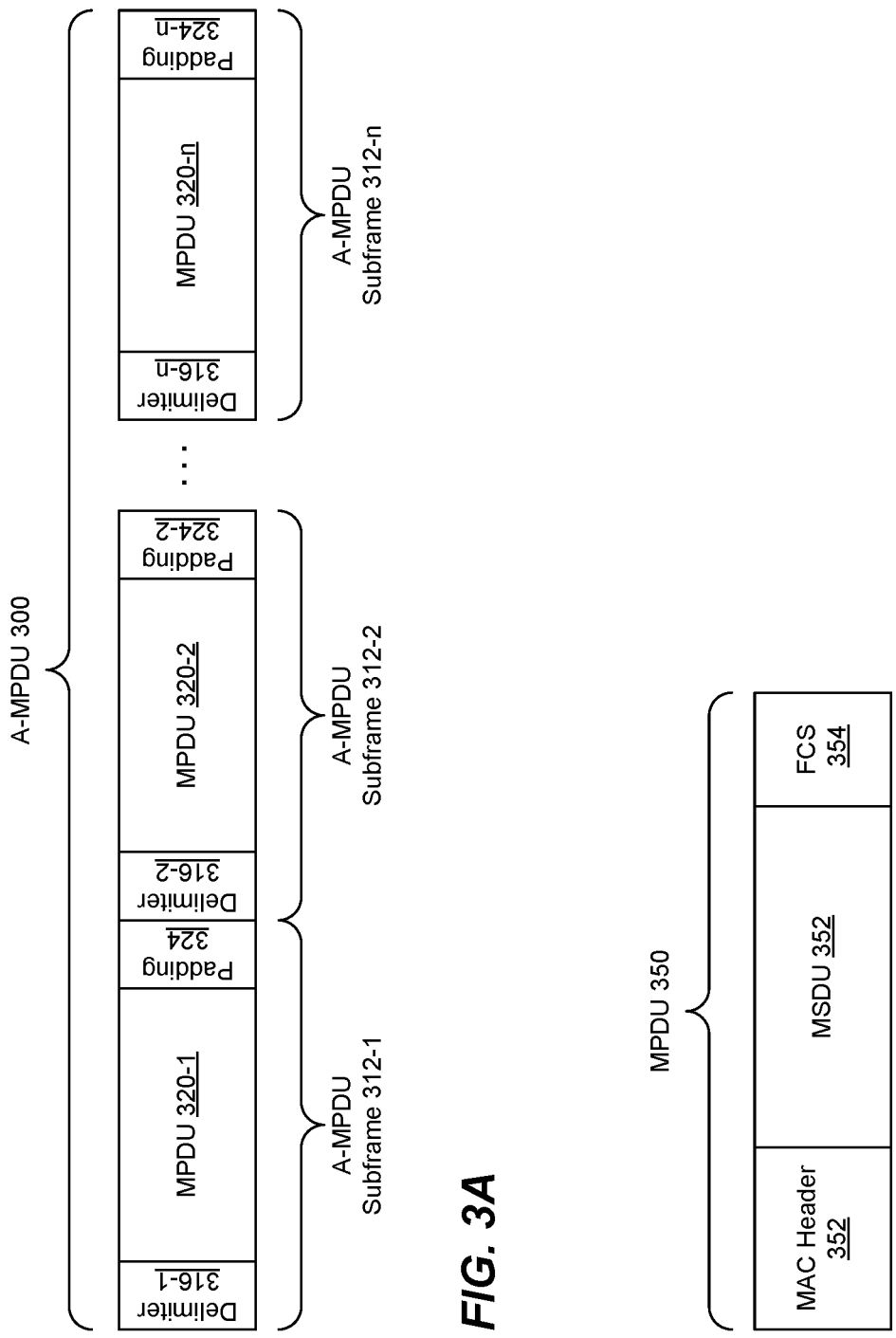
FIGS. 3A-B are a block diagram of example medium access control (MAC) layer data units, according to an embodiment.

In an embodiment, the PHY data portion 240 includes one or more MPDUs generated by a network interface device. For example, the PHY data portion 240 includes an A-MPDU generated by the network interface device. In an embodiment in which multiple PPDUs such as the PPDU 200 are generated for simultaneous transmission over respective ones of multiple frequency segments, respective PHY data portions of the multiple PPDUs includes respective A-MPDUs generated by the network interface device (e.g., generated by the network interface device 122/162, generated by the MAC processor 126/166, generated by the multi-channel MAC data unit generator 142, etc.) for simultaneous transmission over respective ones of the multiple frequency segments. FIG. 3A is a block diagram of an A-MPDU 300 that is included in the PHY data portion 240 of the PPDU 200, according to an embodiment. The network interface 122/162 (e.g., the multi-channel MAC data unit generator 142) is configured to generate multiple A-MPDUs such as the A-MPDU 300 for simultaneous transmission over respective ones of multiple frequency segments, according to an embodiment. The A-MPDU 300 includes a plurality of A-MPDU subframes 312, where each A-MPDU subframe 312 corresponds to a PSDU, according to an embodiment. Each A-MPDU subframe 312 includes an MPDU delimiter 316, an MPDU 320, and optional padding bits 324. Referring now to FIG. 3B, an MPDU 350 corresponds to each of the MPDUs 320, according to an embodiment. The MPDU 350 includes a MAC header 352, an MSDU 354 and a frame check sequence (FCS) field 356, in an embodiment.

Figure 4:
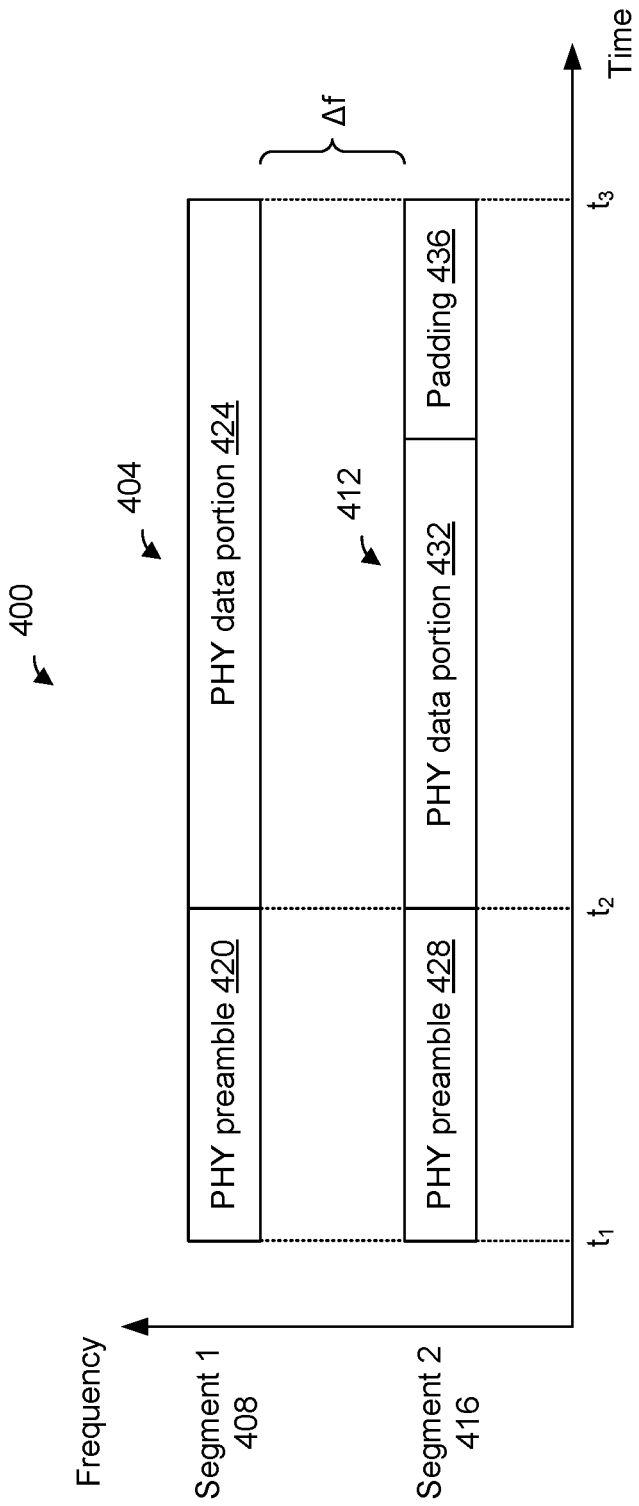
FIG. 4 is a diagram of an example transmission over multiple frequency segments of a communication channel, according to an embodiment.

FIG. 4 is a diagram of an example transmission 400 over multiple frequency segments of a communication channel, according to an embodiment. In an embodiment, the AP 114 (FIG. 1) is configured to (e.g., the network interface device 122 is configured to, the PHY processor 130 is configured to, the multi-channel transmit processor 146 is configured to, etc.) generate and transmit the transmission 400 to one or more client stations 154. In another embodiment, a client station 154 (FIG. 1) is configured to (e.g., the client station 154-1 is configured to, the network interface device 162 is configured to, the PHY processor 170 is configured to, etc.) generate and transmit the transmission 400 to the AP 114 and/or one or more other client stations 154).

The transmission 400 comprises a PPDU 404 in a first frequency segment 408 and a second PPDU 412 in a second frequency segment 416. The first PPDU 504 comprises a PHY preamble 420 and a PHY data portion 424. The second PPDU 412 comprises a PHY preamble 428, a data portion 432, and optional padding 436. In an embodiment, transmission of the first PPDU 404 of the transmission 400 is simultaneous with the transmission of the second PPDU 412 of the transmission 400. In an embodiment, the transmission 400 is synchronized such that transmission of the first PPDU 404 and the second PPDU 412 starts at a same time instance ti and ends at a same time instance $t_3$. In an embodiment, the transmission 400 is further synchronized such the PHY preamble 420 and the PHY preamble 428 are of a same duration. In an embodiment in which the PHY data portion 432 has a shorter duration than the PHY data portion 424, the PHY data portion 432 is appended with the padding 436 so that transmission of the PPDU 412 ends at $t_3$. In other embodiments, the transmission 400 is asynchronous. For example, transmission of the first PPDU 402 does not start at a same time instance as transmission of the second PPDU 412 and/or transmission of the first PPDU 402 does not end at a same time instance as transmission of the second PPDU 412, in an embodiment.

In an embodiment, the PHY preamble 420 and the PHY preamble 428 are formatted in a manner similar to the PHY preamble 210 of FIG. 2. In an embodiment, at least a portion of the PHY preamble 420 and at least a portion of the PHY preamble 428 have the same structure and/or include the same information. In an embodiment, at least a portion of the PHY preamble 420 and at least a portion of the PHY preamble 428 are identical.

In an embodiment in which the first frequency segment 408 comprises multiple component channels, at least a portion of the PHY preamble 420 (e.g., a legacy portion) is generated by generating a field corresponding to one component channel and duplicating the field over one or more other component channels corresponding to the first frequency segment 408. In an embodiment in which the second frequency segment 416 comprises multiple component channels, at least a portion of the PHY preamble 428 (e.g., a legacy portion) is generated by generating a field corresponding to one component channel and duplicating the field over one or more other component channels corresponding to the second frequency segment 416.

In various embodiments, the first frequency segment 408 and the second frequency segment 416 are in different RF bands or are co-located in a same RF band. In an embodiment, the RF band(s) correspond to the 2 GHz band, the 5 GHz band, and the 6 GHz bands, as described above. The first frequency segment 408 and the second frequency segment 416 may each be comprised of one or more of component channels. In an embodiment, a frequency bandwidth of the first frequency segment 408 (i.e., a frequency bandwidth of the first PPDU 404) is different than a frequency bandwidth of the second frequency segment 416 (i.e., a frequency bandwidth of the second PPDU 412). In another embodiment, the frequency bandwidth of the first frequency segment 408 is the same as the frequency bandwidth of the second frequency segment 416.

In an embodiment, the first frequency segment 408 and the second frequency segment 416 are separated in frequency. For example, a gap in frequency exists between the first frequency segment 408 and the second frequency segment 416. In various embodiments, the gap is at least 500 kHz, at least 1 MHz, at least 5 MHz, at least 20 MHz, etc.

In an embodiment, the transmission 400 corresponds to a single user (SU) transmission that is generated and transmitted to a single communication device. In an embodiment, the transmission 400 corresponds to a multi-user (MU) transmission that includes data for multiple communication devices (e.g., the client stations 154). For example, in an embodiment, the MU transmission 400 is an OFDMA transmission. In another embodiment, the MU transmission 400 is an MU-MIMO transmission. In an embodiment, one of the first PPDU 404 and the second PPDU 412 corresponds to an SU transmission, and the other one of the first PPDU 404 and second PPDU 412 corresponds to an MU transmission, such as an OFDMA or an MU-MIMO transmission. For example, a MAC data unit (e.g., A-MPDU) included in the PHY data portion 424 of the first PPDU 404 includes multiple data streams for multiple communication for multiple communication devices (e.g., the client stations 154).

In an embodiment, the data portion 424 of the PPDU 404 includes a first A-MPDU such as the A-MPDU 300 (FIG. 3) generated for transmission in the first frequency segment 408 and the data portion 432 of the PPDU 412 includes a second A-MPDU such as the A-MPDU 300 (FIG. 3) generated for transmission in the second frequency segment 416. The first A-MPDU is of a first length and the second A-MPDU is of a second length different from the first length in an embodiment. For example, the first A-MPDU includes a first number of information bits (e.g., a first number of A-MPDU sub-frames 312) and the second A-MPDU includes a second number of information bits (e.g., a second number of A-MPDU sub-frames 312) that may be different from the first number of information bits, in an embodiment. In an embodiment, the particular number of information bits included in the first A-MPDU is determined based on PHY parameters (e.g., frequency bandwidth, data rate, etc.) to be used for transmission in the first frequency segment 408 and the particular number of information bits included in the second A-MPDU is determined based on PHY parameters (e.g., frequency bandwidth, data rate, etc.) to be used for transmission in the second frequency segment 416.

In some embodiments, the first PPDU 404 is transmitted via a first number of spatial or space-time streams (hereinafter referred to as "spatial streams" for brevity), and the second PPDU 412 is transmitted via a second number of spatial streams that is different than the first number of spatial streams. In one such embodiment, the PHY preamble 420 and the PHY preamble 428 comprise a same number of LTFs even when the first PPDU 404 is transmitted via a first number of spatial streams and the second PPDU 412 is transmitted via a second number of spatial streams that is different than the first number of spatial streams. In an embodiment, the same number of LTFs correspond to one of the first PPDU 404 and the second PPDU 412 with the larger number of spatial streams. In other embodiments, the first PPDU 404 and the second PPDU 412 are transmitted via a same number of spatial streams.

In an embodiment, at least the PHY data portion 424 and at least the PHY data portion 432 employ different encoding schemes and/or modulation schemes. As an example, in an embodiment, the PHY data portion 424 is generated using a first MCS and the PHY data portion 432 is generated using a second, different MCS. In other embodiments, the PHY data portion 424 and the PHY data portion 432 are generated using a same MCS.

In an embodiment, the transmission 400 corresponds to a single PPDU, where a first frequency portion of the single PPDU is transmitted via the first channel 408 and a second frequency portion of the single PPDU is transmitted via the second channel 416. In another embodiment, the first PPDU 404 corresponds to a first PPDU and the second PPDU 412 corresponds to a second PPDU. In an embodiment, each of the PHY preambles 420 and 428, and the PHY data portions 424 and 432, are comprised of one or more OFDM symbols.

Figure 5:
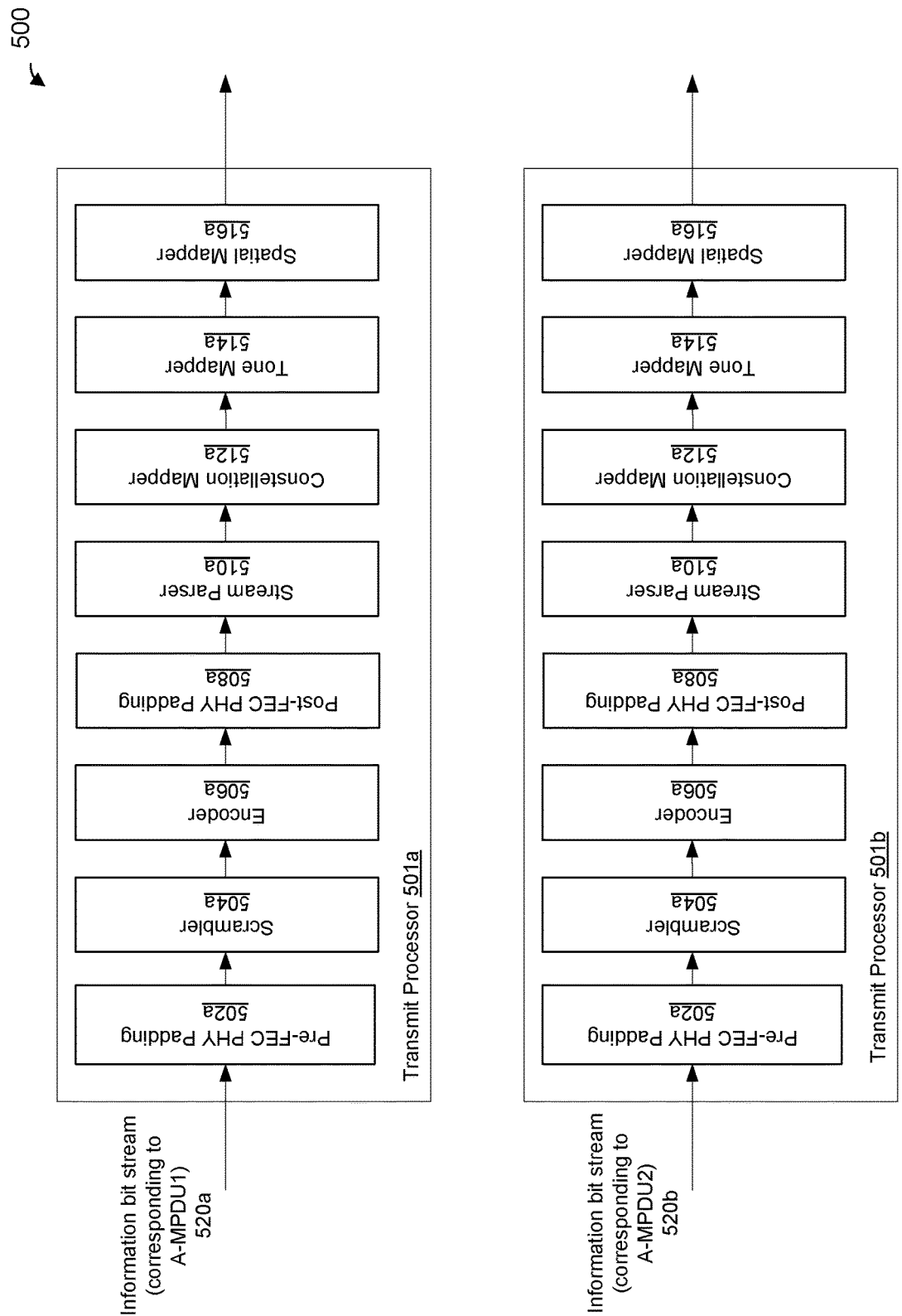
FIG. 5 is a block diagram of an example multi-channel transmit processor 500, according to an embodiment.

FIG. 5 is a block diagram of an example multi-channel transmit processor 500, according to an embodiment. Referring to FIG. 1, the PHY processor 130 of the AP 114 and the PHY processor 170 of client station 154-1 each include and/or are configured to perform the processing of the multi-channel transmit processor 500, in one embodiment. In an embodiment, the multi-channel transmit processor 146 (FIG. 1) corresponds to the multi-channel transmit processor 500. The multi-channel transmit processor 500 is configured to generate PPDUs for multi-channel transmissions, such as the transmission 400 of FIG. 4, over multiple frequency segments, in an embodiment.

The multi-channel transmit processor 500 includes multiple transmit processors 501 corresponding to respective ones of the frequency segments, including a first transmit processor 501a corresponding to a first frequency segment and a second transmit processor 501b corresponding to a second frequency segment, in an embodiment. The multi-channel transmit processor 500 is configured to receive information bits streams 520 corresponding to multiple MPDUs (e.g., A-MPDUs), such as a first information bit stream 520a corresponding to a first A-MPDUs and a second information bit stream 520b corresponding to a second A-MPDU, and to provide respective ones of the information bit streams 520 to the corresponding ones of the multiple transmit processors 501. In some embodiments, the MAC processor 126/166 adds padding to one or more of the A-MPDUs provided to the multi-channel transmit process 500 to align the A-MPDUs in time. The multiple transmit processors 501 are configured to operate in parallel to encode, modulate, etc. the respective information bits streams 520 to generate respective PPDUs for transmission over the corresponding frequency segments, in an embodiment.

Each of the transmit processors 501 includes a respective pre forward error correction coder (pre-FEC) PHY padding unit 502, a respective scrambler 504, a respective FEC encoder 506, a respective post-FEC padding unit 508, a respective stream parser 510, a respective constellation mapper 512, a respective tone mapper 514 and a respective spatial mapper 516, in an embodiment. The pre-FEC PHY padding units 502 are configured to add padding bits to the respective information bit streams 520 prior to encoding the information bits stream. In an embodiment, respective ones of the pre-FEC PHY padding units 502 are configured to independently calculate respective numbers of pre-FEC padding bits to be added to the respective information bits streams, for example based on respective numbers of bits in the respective information bits streams.

Outputs of the pre-FEC PHY padding units 502 are coupled to inputs of the respective scramblers 504. The scramblers 504 are configured to scramble the respective information bit streams to reduce occurrences of long sequences of ones or zeros in the information bit streams, in an embodiment. Respective outputs of the scramblers 504 are coupled to inputs of the respective FEC encoders 506. In an embodiment, the FEC encoders 506 include binary convolutional coder (BCC). In another embodiment, each FEC encoders 506 includes a BCC followed by a puncturing block. In some embodiments in BCC encoding is unitized, each FEC encoder 506 include multiple BCC encoders configured to operate in parallel, with different numbers of BCC encoders operating in parallel depending on the particular modulation and coding scheme (MCS), bandwidth, and number of spatial streams. In such embodiments, the transmit processors 501 include respective encoder parsers (not shown) that parse the respective information bit streams into multiple encoder input bit streams. In another embodiment, each FEC encoder 506 includes a low density parity check (LDPC) encoder.

In some embodiments, different encoding schemes are utilized to encode information bit streams for different frequency segments. For example, the FEC encoder 506 includes one or more BCC encoders and the FEC encoder includes an LDPC encoder, or vice versa, in in an embodiment. In another embodiment, same encoding schemes but different coding rates are utilized for respective frequency segments. In another embodiment, same coding rates are utilized for respective frequency segments.

Outputs of the FEC encoders 506 are coupled to inputs of the respective post-FEC padding units 508. The post-FEC padding units 508 are configured to add respective numbers of padding bits the respective information bit streams after the information bit streams are encoded by the respective FEC encoders 506. In an embodiment, respective post-FEC padding units 508 are configured to independently calculate respective numbers of post-FEC padding bits to be added to the respective information bits streams. In an embodiment, the respective numbers of post-FEC padding bits to be added to the respective information bits streams are determined such that the respective coded information bit streams fully fill respective numbers of OFDM symbols.

Outputs of the post-FEC padding units 508 are coupled to inputs of the respective stream parsers 510. The stream parsers 510 are configured to parse the coded information bit streams into one or more spatial streams for separate interleaving and mapping into constellation points/symbols. In an embodiment, the stream parsers 510 parse the respective coded information bit streams into different numbers of spatial streams, depending on the number of spatial streams to be use for transmission in the corresponding frequency segments.

Outputs of the stream parsers 510 are coupled to inputs of the respective constellation mappers 512. In an embodiment, the constellation mappers 512 map sequences of bits to constellation points corresponding to different subcarriers/ tones of an OFDM symbol. More specifically, for each spatial stream, a constellation mapper 512 translates every bit sequence of length $\log_2(M)$ into one of M constellation points, in an embodiment. The constellation mapper 512 handles different numbers of constellation points depending on the MCS being utilized. In an embodiment, the constellation mapper 512 is a quadrature amplitude modulation (QAM) mapper that handles M=2, 4, 16, 64, 256, and 1024. In other embodiments, the constellation mapper 512 handles different modulation schemes corresponding to M equaling different subsets of at least two values from the set {2, 4, 16, 64, 256, 1024}. In an embodiment, respective constellation mappers 512 handle different numbers of constellation points depending on particular MCSs being utilized for transmission in the corresponding frequency segments.

In an embodiment, when LDPC encoding is utilized, outputs of the constellation mappers 512 are operated on by respective tone mappers 514. In some embodiments, when BCC encoding is utilized (e.g., when an FEC encoders 506a, 506b utilize BCC encoding), the corresponding tone mappers 514 are bypassed or omitted. A tone mapper 514 reorders constellation points corresponding to a spatial stream according to a tone remapping function. The tone remapping function is generally defined such that consecutive coded bits or blocks of information bits are mapped onto nonconsecutive tones in the OFDM symbol to facilitate data recovery at the receiving device in cases in which consecutive OFDM tones are adversely affected during transmission. Tone mapper parameters (e.g., "tone mapping distance" or the distance between two OFDM tones onto which adjacent constellation points are mapped) may be different in different embodiments.

Outputs of the respective tone mappers 514 (or outputs of the respective constellation mappers 512 if the tone mappers 514 are omitted) are coupled to inputs of the respective spatial mappers 516. A spatial mapper 516 maps spatial streams to $N_{TX}$ transmit chains. In various embodiments, spatial mapping includes one or more of: 1) direct mapping, in which constellation points from each space-time stream are mapped directly onto transmit chains (i.e., one-to-one mapping); 2) spatial expansion, in which vectors of constellation points from all space-time streams are expanded via matrix multiplication to produce inputs to the transmit chains; and 3) beamforming, in which each vector of constellation points from all of the space-time streams is multiplied by a matrix of steering vectors to produce inputs to the transmit chains. Each output of a spatial mapper 516 corresponds to a transmit chain, and each output of the spatial mapper 516 is operated on by an IDFT processor (e.g., an inverse fast Fourier transform (IFFT) calculation unit) (not shown) that converts blocks of constellation points to respective time-domain signals. Time-domain signals corresponding to respective frequency segments are then up-converted to respective RF frequencies corresponding to the respective frequency segments, in an embodiment.

In some embodiments, the multi-channel transmit processor 500 is configured to receive a an information bit stream corresponding to a single MAC layer data unit, such as a single A-MPDU, and to parse the information bit stream corresponding to the single A-MPDU into a plurality of bit streams for respective transmission over multiple frequency segments. In such embodiments, the multi-channel transmit processor 500 includes a segment parser (not included in the embodiment of FIG. 5) configured to parse the information bit stream corresponding to the single A-MPDU into a plurality of bit streams for respective transmission over multiple frequency segments. The segment parser parses the information bit stream corresponding to the single A-MPDU to respective frequency segments by providing respective numbers of bits from the set of information bits to respective ones of the frequency segments, the respective numbers of information bits depending on PHY parameters (e.g., frequency bandwidth, data rate, etc.) to be used for transmission in the corresponding frequency segments.

In various embodiments, depending on placement of the segment parser in the multi-channel transmit processor 500, some of the components 502-516 of the multi-channel transmit processor 500 are shared between multiple frequency segments. For example, in an embodiment, the segment parser is placed immediately preceding the spatial mappers 516 configured to spatially map spatial streams to transmit chains for transmission over respective frequency segments. In this embodiment, the single information bits stream corresponding to the single A-MPDU is commonly processed using a single set of components 502-514 before being parsed into multiple frequency segments. As another example, in another embodiment, the segment parser is placed immediately preceding the constellation mappers 512. In this embodiment, the single information bits stream corresponding to the single A-MPDU is commonly processed using a single set of components 502-510 before being parsed into multiple frequency segments. As still another example, in another embodiment, the segment parser is placed immediately preceding the stream parsers 510. In this embodiment, the single information bits stream corresponding to the single A-MPDU is commonly processed using a single set of components 502-508 before being parsed into multiple frequency segments. As yet another example, in another embodiment, the segment parser is placed immediately preceding pre-FEC padding units 502. In this embodiment, the single information bits stream corresponding to the single A-MPDU is first parsed into multiple frequency segments, and the parsed information bits are then processed using respective components 502-516 of the transmit processors 501a, 501b. Generally, placing the segment parser farther down the transmit chain results in a greater number of shared components 502-516 between the multiple frequency segments at the expense of capability to use different PHY parameters (e.g., MCS, Nss, etc.) for simultaneous transmission in respective frequency segments.

Figure 6:
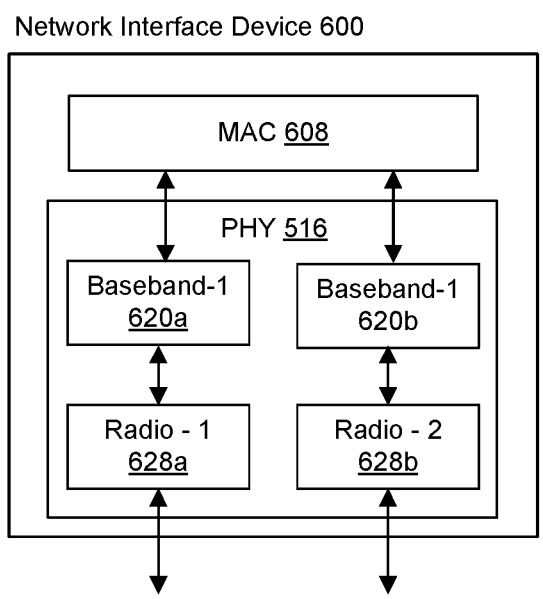
FIG. 6 is a diagram of an example network interface device configured for multi-channel segment operation, according to an embodiment.

FIG. 6 is a diagram of an example network interface device 600 configured for multi-channel segment operation, according to an embodiment. In an embodiment, the network interface device 600 corresponds to the network interface device 122 of the AP 114 of FIG. 1. In another embodiment, the network interface device 600 corresponds to the network interface device 162 of the client station 154-1 of FIG. 1.

The network interface device 600 is configured for operation over two frequency segments, in the illustrated embodiment. The network interface device 600 includes a MAC processor 608 coupled to a PHY processor 616. The MAC processor 608 exchanges frames (or PSDUs) with the PHY processor 616.

In an embodiment, the MAC processor 608 corresponds to the MAC processor 126 of FIG. 1. In another embodiment, the MAC processor 608 corresponds to the MAC processor 166 of FIG. 1. In an embodiment, the PHY processor 616 corresponds to the PHY processor 130 of FIG. 1. In another embodiment, the PHY processor 616 corresponds to the PHY processor 170 of FIG. 1.

The PHY processor 616 includes a first baseband signal processor 620a corresponding to a first frequency segment and a second baseband signal processor 602b corresponding to a second frequency segment. The first baseband signal processor 620a is coupled to a first RF radio (Radio-1) 628a and the second baseband signal processor 602b is coupled to a second RF radio (Radio-2) 628b. In an embodiment, the RF radio 628a and the RF radio 628b correspond to the transceivers 134 of FIG. 1. In another embodiment, the RF radio 628a and the RF radio 628b correspond to the transceivers 174 of FIG. 1. In an embodiment, the RF radio 628a is configured to operate on a first RF band, and the RF radio 628b is configured to operate on a second RF band. In another embodiment, the RF radio 628a and the RF radio 628b are both configured to operate on the same RF band.

In an embodiment, the MAC processor 608 generates data corresponding to MAC layer data units (e.g., frames) and provides the frames (or PSDUs) to the baseband signal processors 620. Each baseband signal processor 620 is configured to receive frames (or PSDUs) from the MAC processor 608, and encapsulate the frames (or PSDUs) into respective packets and generate respective baseband signals corresponding to the respective packets.

Although the network interface 600 is illustrated in FIG. 6 including a single MAC processor 608, the network interface device 600 includes multiple MAC processors 608, with respective ones of the multiple MAC processors 608 corresponding to respective ones of the frequency segments, in some embodiments. The multiple MAC processors 608 are synchronized, in some embodiments. For example, the multiple MAC processors 608 are synchronized so that respective ones of the multiple MAC processors 608 provide respective MAC layer data units to the baseband signal processors 620 at a same time or during a same time interval, in an embodiment.

The first baseband signal processor 620a includes a first transmit processor (e.g., the transmit processor 501a of FIG. 5) configured to receive a first information bit stream corresponding to a first A-MPDU generated by the MAC processor 608, to generate a first PPDU to include the first A-MPDU for transmission over the first frequency segment, and to perform PHY processing (e.g., encoding, modulating, spatial stream parsing, etc.) of the first PPDU to prepare the first PPDU for transmission in the first frequency segment. The second baseband signal processor 620a includes a second transmit processor (e.g., the transmit processor 501b of FIG. 5) configured to receive a second information bit stream corresponding to a second A-MPDU generated by the MAC processor 608, to generate a second PPDU to include the second A-MPDU for transmission over the second frequency segment, and to perform PHY processing (e.g., encoding, modulating, spatial stream parsing, etc.) of the second PPDU to prepare the second PPDU for transmission in the second frequency segment. In an embodiment, the first transmit processor generates the first PPDU in parallel with the second transmit processor generating the second PPDU. In an embodiment, because the first PPDU and the second PPDU are generated using respective information bit streams corresponding to respective A-MPDUs generated by the MAC processor, the first PPDU and the second PPDU are generated using different PHY parameters (e.g., MCS, Nss, etc.) that are determined according to respective RF channel characteristics of the first frequency segment and the second frequency segment, in an embodiment.

The baseband signal processor 620a provides the respective baseband signal generated by the baseband signal processor 620a to the Radio-1 628a. The baseband signal processor 620b provides the respective baseband signal generated by the baseband signal processor 620b to the Radio-1 628b. The Radio-1 628a and Radio-2 628b upconvert the respective baseband signals to generate respective RF signals for transmission via the first frequency segment and the second frequency segment, respectively. The Radio-1 628a transmits a first RF signal via the first frequency segment and the Radio-2 628b transmits a second RF signal via the second frequency segment.

The Radio-1 628a and the Radio-2 628b are also configured to receive respective RF signals via the first frequency segment and the second frequency segment, respectively. The Radio-1 628a and the Radio-2 628b generate respective baseband signals corresponding to the respective received signals. The generated respective baseband signals are provided to the respective baseband signal processors 620a and 620b. The respective baseband signal processors 620a and 620b generate respective PSDUs corresponding to the respective received signals, and provide the respective PSDUs to the MAC processor 608. The MAC processor 608 processes the PSDUs received from the baseband signal processors 620a and 620b, in an embodiment.

Figure 7:
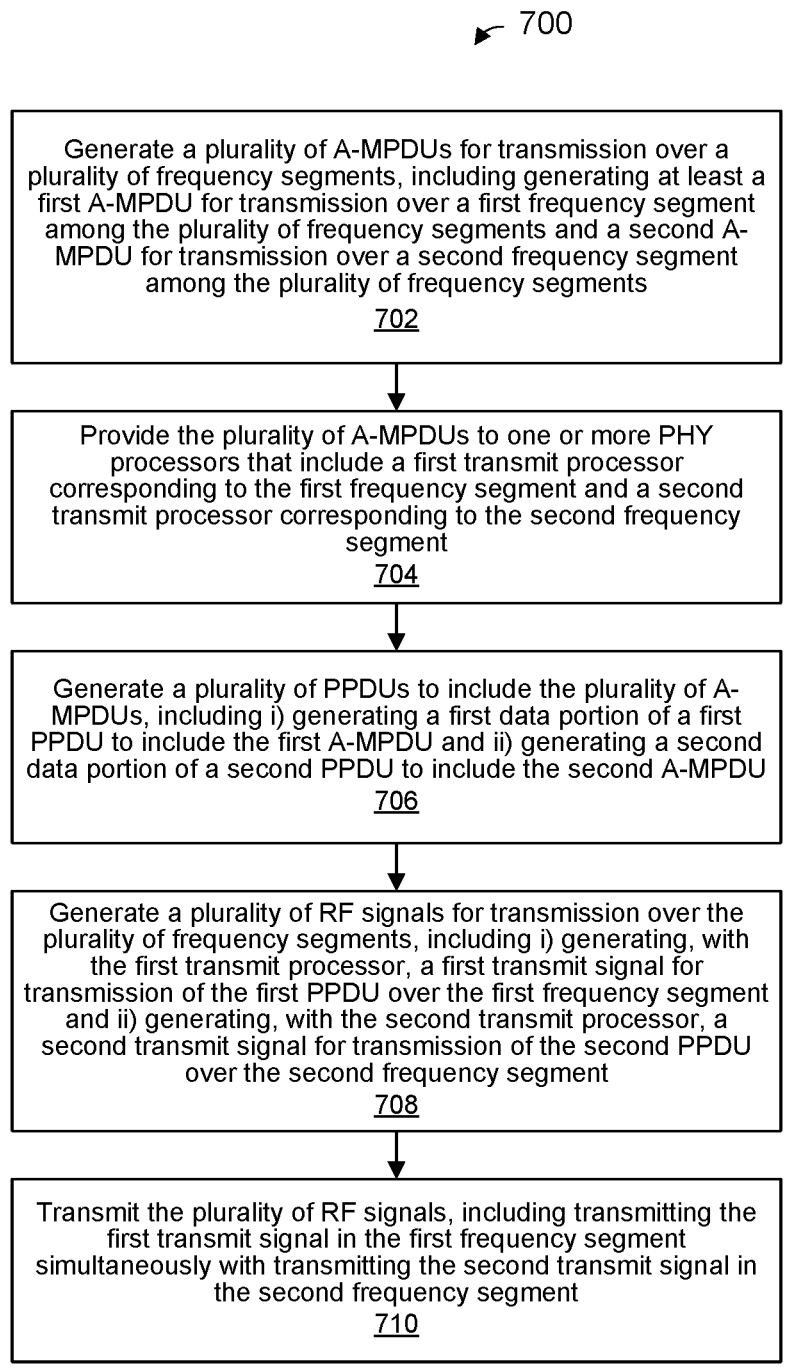
FIG. 7 is a flow diagram of an example method for signal generation and transmission over multiple frequency segments, according to an embodiment.

FIG. 7 is a flow diagram of an example method 700 for signal generation and transmission over multiple frequency segments, according to an embodiment. The AP 114 of FIG. 1 is configured to implement the method 700, according to some embodiments. The client station 154-1 of FIG. 1 is additionally or alternatively configured to implement the method 700, according to other embodiments. The method 700 is described in the context of the AP 114 merely for explanatory purposes and, in other embodiments, the method 700 is implemented by the client station 154-1 or another suitable communication device, according to various embodiments.

At block 702, a plurality of A-MPDUs for transmission over a plurality of frequency segments of a communication channel is generated. In an embodiment, a single MAC processor (the MAC processor 126, the multi-channel MAC data unit generator 146) generates the plurality of A-MPDUs. In an embodiment, generating the plurality of A-MPDUs includes generating at least a first A-MPDU for transmission over a first frequency segment among the plurality of frequency segments and a generating second A-MPDU for transmission over a second frequency segment among the plurality of frequency segments. In an embodiment, each of the first A-MPDU and the second A-MPDU has a structure of the A-MPDU 300 of FIG. 3A. In an embodiment, the first A-MPDU includes a first information bit stream corresponding to a first length of the first A-MPDU and the second A-MPDU includes a second information bits stream corresponding to a second length of the second A-MPDU. In an embodiment, the first information bit stream includes a first number of information bits determined based on a data rate at which the first A-MPDU is to be transmitted in the first frequency segment and the second information bit stream includes a second number of bits determined based on a second data rate at which the second A-MPDU is to be transmitted in the second frequency segment.

At block 704, the plurality of A-MPDUs generated at block 702 are provided to one PHY processors that include at least a first transmit processor corresponding to the first frequency segment and a second transmit processor corresponding to the second frequency segment. In an embodiment, the plurality of A-MPDUs are provided to the PHY processor 130 that includes the multi-channel transmit processor 500 including the first transmit processor 501a and the second transmit processor 501b.

At block 706, a plurality PPDUs is generated to include the plurality of A-MPDUs. In an embodiment, the one or more PHY processors generate the plurality of PPDUs. For example, the PHY processor 130 generates the plurality of PPDUs, in an embodiment. In an embodiment, generating the plurality of PPDUs includes generating a first data portion of a first PPDU to include the first A-MPDU and generating a second data portion of a second PPDU to include the second A-MPDU. In an embodiment, the first PPDU and the second PPDU each corresponds to the PPDU 200 of FIG. 2. In an embodiment, the first PPDU corresponds to the PPDU 404 of FIG. 4 and the second PPDU corresponds to the PPDU 412 of FIG. 4. In other embodiments, other suitable PPDUs are generated.

At block 708 a plurality of RF signals is generated for transmission over the plurality of frequency segments. In an embodiment, generating the plurality of RF signals includes i) generating, with the first transmit processor, a first RF signal for transmission of the first PPDU over the first frequency segment and ii) generating, with the second transmit processor, a second RF signal for transmission of the second PPDU over the second frequency segment. In various embodiments, the first RF signal is generated based on a first set of PHY parameters and the second RF signal is generated based on a second set of PHY parameters, where at least some PHY parameters in the first set of PHY parameters have different values that corresponding PHY parameters in the second set of PHY parameters. For example, in an embodiment, generating the first RF signal includes encoding the first set of information bits corresponding to the first A-MPDU using a first coding rate, and generating the second RF signal includes encoding the second set of information bits corresponding to the second A-MPDU using a second coding rate different from the first coding rate. As another example, in an embodiment, generating the first RF signal includes modulating the first set of information bits corresponding to the first A-MPDU using a first modulation scheme, and generating the second RF signal includes modulating the second set of information bits corresponding to the second A-MPDU using a second coding rate different from the first coding rate. As yet another example, in an embodiment, generating the first RF signal includes parsing the first set of information bits corresponding to the first A-MPDU to a first number of spatial streams, and generating the second RF signal includes parsing the second set of information bits corresponding to the second A-MPDU to a second number of spatial streams different than the first number of spatial streams.

At block 710, the plurality of RF signals are transmitted over the plurality of frequency segments. In an embodiment, transmitting the plurality of RF signals includes transmitting the first RF signal in the first frequency segment simultaneously with transmitting the second RF signal in the second frequency segment. In an embodiment, transmitting the plurality of RF signals includes transmitting the first RF signal in the first frequency segment synchronously with transmitting the second RF signal in the second frequency segment. In another embodiment, transmitting the plurality of RF signals includes transmitting the first RF signal in the first frequency segment asynchronously with transmitting the second RF signal in the second frequency segment.

In an embodiment, a method for simultaneous transmission of data over a plurality of frequency segments of a communication channel includes: generating, at one or more synchronized control (MAC) processors implemented on one or more integrated circuit (IC) devices, a plurality of aggregated MAC protocol data units (A-MPDUs) for transmission over the plurality of frequency segments, including generating at least a first A-MPDU for transmission over a first frequency segment among the plurality of frequency segments and a second A-MPDU for transmission over a second frequency segment among the plurality of frequency segments; providing, with the one or more synchronized MAC processors, the plurality of A-MPDUs to one or more physical layer (PHY) processors implemented on the one or more IC devices, the one or more PHY processors including at least a first transmit processor corresponding to the first frequency segment and a second transmit processor corresponding to the second frequency segment; generating, with the one or more PHY processors, a plurality of PHY protocol data units (PPDUs) to include the plurality of A-MPDUs, including i) generating a first data portion of a first PPDU to include the first A-MPDU and ii) generating a second data portion of a second PPDU to include the second A-MPDU; generating, with the one or more PHY processors, a plurality of radio frequency (RF) signals for transmission over the plurality of frequency segments, including i) generating, with the first transmit processor, a first RF signal for transmission of the first PPDU over the first frequency segment and ii) generating, with the second transmit processor, a second RF signal for transmission of the second PPDU over the second frequency segment; and transmitting, with the one or more PHY processors, the plurality of RF signals, including transmitting the first RF signal in the first frequency segment simultaneously with transmitting the second RF signal in the second frequency segment.

In other embodiments, the method also includes one of, or any suitable combination of two or more of, the following features.

Generating the first A-MPDU comprises generating the first A-MPDU to include a first information bit stream corresponding to a first A-MPDU length, and generating the second A-MPDU comprises generating the second A-MPDU to include a second information bit stream corresponding to a second A-MPDU length.

Generating the first A-MPDU comprises generating the first information bit stream to include a first number of bits determined based on a first data rate at which the first A-MPDU is to be transmitted in the first frequency segment, and generating the second A-MPDU comprises generating the second information bit stream to include a second number of bits determined based on a second data rate at which the second A-MPDU is to be transmitted in the second frequency segment.

Generating the plurality of RF signals includes: encoding, with the first transmit processor, the first information bit stream corresponding to the first A-MPDU using a first coding rate, and encoding, with the second transmit processor, the second information bit stream corresponding to the second A-MPDU using a second coding rate different from the first coding rate.

Generating the plurality of RF signals includes: modulating, with the first transmit processor, the first information bit stream of the first A-MPDU according to a first modulation scheme, and modulating, with the first transmit processor, the second information bit stream of the second A-MPDU according to a second modulation scheme different from the first modulation scheme.

Generating the plurality of RF signals includes: parsing, with the first transmit processor, the first information bit stream of the first A-MPDU to a first number of spatial streams, and parsing, with the second transmit processor, the second information bit stream of the second A-MPDU to a second number of spatial streams different from the first number of spatial streams.

Generating the plurality of PPDUs comprises generating the plurality of PPDUs corresponding to a single user (SU) transmission to a single communication device.

Generating the plurality of PPDUs comprises generating the plurality of PPDUs corresponding to a multi-user (MU) transmission to multiple communication devices.

Transmitting the plurality of RF signals includes transmitting the first RF signal in the first frequency segment synchronously with transmitting the second RF signal in the second frequency segment.

Transmitting the plurality of RF signals includes transmitting the first RF signal in the first frequency segment asynchronously with transmitting the second RF signal in the second frequency segment.

In another embodiment, a communication device comprises: a wireless network interface device implemented on one or more integrated circuit (IC) devices; one or more synchronized media access control (MAC) processors implemented on the one or more IC devices, the one or more synchronized MAC processors configured to generate a plurality aggregated MAC protocol data units (A-MPDUs) for transmission over a plurality of frequency segments of a communication channel, including at least a first A-MPDU for transmission over a first frequency segment among the plurality of frequency segments and a second A-MPDU for transmission over a second frequency segment among the plurality of frequency segments; and one or more physical layer (PHY) processors implemented on the one or more IC devices, the one or more PHY processors, the one or more PHY processors comprising at least a first transmit processor corresponding to the first frequency segment and a second transmit processor corresponding to the second frequency segment. The one or more IC devices are configured to: generate a plurality of PHY protocol data units (PPDUs) to include the plurality of A-MPDUs generated by the one or more MAC processors, including i) generating a first data portion of a first PPDU to include the first A-MPDU and ii) generating a second data portion of a second PPDU to include the second A-MPDU; generate a plurality of RF signals for transmission over the plurality of frequency segments, including i) generating, with the first transmit processor, a first RF signal for transmission of the first PPDU over the first frequency segment and ii) generating, with the second transmit processor, a second RF signal for transmission of the second PPDU over the second frequency segment; and transmit the plurality of RF signals, including transmitting the first RF signal in the first frequency segment simultaneously with transmitting the second RF signal in the second frequency segment.

In other embodiments, the communication device also comprises one of, or any suitable combination of two or more of, the following features.

The one or more IC devices are configured to: generate the first A-MPDU to include a first information bit stream corresponding to a first A-MPDU length, and generate the second A-MPDU to include a second information bit stream corresponding to a second A-MPDU length.

The one or more integrated circuits are configured to: generate the first information bit stream to include a first number of bits determined based on a first data rate at which the first A-MPDU is to be transmitted in the first frequency segment, and generate the second information bit stream to include a second number of bits determined based on a second data rate at which the second A-MPDU is to be transmitted in the second frequency segment.

The one or more IC devices are configured to: encode, with the first transmit processor, the first information bit stream corresponding to the first A-MPDU using a first coding rate, and encode, with the second transmit processor, the second information bit stream corresponding to the second A-MPDU using a second coding rate different from the first coding rate.

The one or more IC devices are configured to: modulate, with the first transmit processor, the first information bit stream of the first A-MPDU according to a first modulation scheme, and modulate, with the first transmit processor, the second information bit stream of the second A-MPDU according to a second modulation scheme different from the first modulation scheme.

The one or more IC devices are configured to: parse, with the first transmit processor, the first information bit stream of the first A-MPDU to a first number of spatial streams, and parse, with the second transmit processor, the second information bit stream of the second A-MPDU to a second number of spatial streams different from the first number of spatial streams.

The one or more IC devices are configured to generate the plurality of PPDUs to correspond to a single user (SU) transmission to a single communication device.

The one or more IC devices are configured to generate the plurality of PPDUs to correspond to a multi-user (MU) transmission to multiple communication devices.

The one or more IC devices are configured to transmit the first RF signal in the first frequency segment synchronously with transmitting the second RF signal in the second frequency segment.

The one or more IC devices are configured to transmit the first RF signal in the first frequency segment asynchronously with transmitting the second RF signal in the second frequency segment.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for simultaneous transmission of data over a plurality of frequency segments of a communication channel, the method comprising:

generating, at one or more synchronized media access control (MAC) processors implemented on one or more integrated circuit (IC) devices, a plurality of aggregated MAC protocol data units (A-MPDUs) to include a plurality of information bit streams for transmission over the plurality of frequency segments, including generating at least a first A-MPDU to include a first information bit stream for transmission over a first frequency segment among the plurality of frequency segments and a second A-MPDU to include a second information bit stream for transmission over a second frequency segment among the plurality of frequency segments, wherein the first frequency segment is in a first RF band that is one of i) a 2 GHz band, ii) a 5 GHz band, and iii) a 6 GHz band, and wherein the second frequency segment is in a second RF band that is another one of i) the 2 GHz band, ii) the 5 GHz band, and iii) the 6 GHz band;

adding, by the one or more synchronized MAC processors, padding to at least the second information bit stream in the second A-MPDU to generate at least a second padded information bit stream, the padding being added, by the one or more synchronized MAC processors, to align the plurality of A-MPDUs in time;

synchronously providing, with the one or more synchronized MAC processors, the plurality of A-MPDUs to one or more physical layer (PHY) processors implemented on the one or more IC devices so that the plurality of A-MPDUs are provided to the one or more PHY processors at a same time, including providing the at least the second padded information bit stream to at least one PHY processor among the one or more PHY processors, the one or more PHY processors including at least a first transmit processor corresponding to the first frequency segment and a second transmit processor corresponding to the second frequency segment;

generating, with the one or more PHY processors, a plurality of PHY protocol data units (PPDUs) to include the plurality of A-MPDUs, including i) generating a first data portion of a first PPDU to include the first A-MPDU and ii) generating a second data portion of a second PPDU to include the second A-MPDU;

generating, with the one or more PHY processors, a plurality of radio frequency (RF) signals for transmission over the plurality of frequency segments, including i) generating, with the first transmit processor, a first RF signal for transmission of the first PPDU over the first frequency segment and ii) generating, with the second transmit processor, a second RF signal for transmission of the second PPDU over the second frequency segment; and transmitting, with the one or more PHY processors, the plurality of RF signals, including transmitting the first RF signal in the first frequency segment simultaneously with transmitting the second RF signal in the second frequency segment.

2. The method of claim 1, wherein:
generating the first A-MPDU comprises generating the first A-MPDU to include the first information bit stream corresponding to a first A-MPDU length, and
generating the second A-MPDU comprises generating the second A-MPDU to include the second information bit stream corresponding to a second A-MPDU length.

3. The method of claim 2, wherein:
generating the first A-MPDU comprises generating the first information bit stream to include a first number of bits determined based on a first data rate at which the first A-MPDU is to be transmitted in the first frequency segment, and
generating the second A-MPDU comprises generating the second information bit stream to include a second number of bits determined based on a second data rate at which the second A-MPDU is to be transmitted in the second frequency segment.

4. The method of claim 2, wherein generating the plurality of RF signals includes:
encoding, with the first transmit processor, the first information bit stream corresponding to the first A-MPDU using a first coding rate, and
encoding, with the second transmit processor, the second information bit stream corresponding to the second A-MPDU using a second coding rate different from the first coding rate.

5. The method of claim 2, wherein generating the plurality of RF signals includes:
modulating, with the first transmit processor, the first information bit stream of the first A-MPDU according to a first modulation scheme, and
modulating, with the second transmit processor, the second information bit stream of the second A-MPDU according to a second modulation scheme different from the first modulation scheme.

6. The method of claim 2, wherein generating the plurality of RF signals includes:
parsing, with the first transmit processor, the first information bit stream of the first A-MPDU to a first number of spatial streams, and
parsing, with the second transmit processor, the second information bit stream of the second A-MPDU to a second number of spatial streams different from the first number of spatial streams.

7. The method of claim 1, wherein generating the plurality of PPDUs comprises generating the plurality of PPDUs corresponding to a single user (SU) transmission to a single communication device.

8. The method of claim 1, wherein generating the plurality of PPDUs comprises generating the plurality of PPDUs corresponding to a multi-user (MU) transmission to multiple communication devices.

9. The method of claim 1, wherein transmitting the plurality of RF signals includes transmitting the first RF signal in the first frequency segment synchronously with transmitting the second RF signal in the second frequency segment.

10. The method of claim 1, wherein transmitting the plurality of RF signals includes transmitting the first RF signal in the first frequency segment asynchronously with transmitting the second RF signal in the second frequency segment.

11. A communication device, comprising:
a wireless network interface device implemented on one or more integrated circuit (IC) devices;
one or more synchronized media access control (MAC) processors implemented on the one or more IC devices, the one or more synchronized MAC processors configured to generate a plurality aggregated MAC protocol data units (A-MPDUs) to include a plurality of information bit streams for transmission over a plurality of frequency segments of a communication channel, including at least a first A-MPDU to include a first information bit stream for transmission over a first frequency segment among the plurality of frequency segments and a second A-MPDU to include a second information bit stream for transmission over a second frequency segment among the plurality of frequency segments, wherein the first frequency segment is in a first RF band that is one of i) a 2 GHz band, ii) a 5 GHz band, and iii) a 6 GHz band, and wherein the second frequency segment is in a second RF band that is another one of i) the 2 GHz band, ii) the 5 GHz band, and iii) the 6 GHz band, wherein the one or more synchronized MAC processors are further configured to:
   add padding to at least the second information bit stream in the second A-MPDU to generate at least a second padded information bit stream, the padding being added, by the one or more synchronized MAC processors, to align the plurality of A-MPDUs in time, and
   synchronously provide the plurality of A-MPDUs to one or more physical layer (PHY) processors implemented on the one or more IC devices so that the plurality of A-MPDUs are provided to the one or more PHY processors at a same time, including providing the at least the second padded information bit stream to at least one PHY processor among the one or more PHY processors, the one or more PHY processors comprising at least a first transmit processor corresponding to the first frequency segment and a second transmit processor corresponding to the second frequency segment;

wherein the one or more IC devices are configured to:
   generate a plurality of PHY protocol data units (PPDUs) to include the plurality of A-MPDUs concurrently provided by the one or more MAC processors, including i) generating a first data portion of a first PPDU to include the first A-MPDU and ii) generating a second data portion of a second PPDU to include the second A-MPDU,
   generate a plurality of RF signals for transmission over the plurality of frequency segments, including i) generating, with the first transmit processor, a first RF signal for transmission of the first PPDU over the first frequency segment and ii) generating, with the second transmit processor, a second RF signal for transmission of the second PPDU over the second frequency segment, and
   transmit the plurality of RF signals, including transmitting the first RF signal in the first frequency segment simultaneously with transmitting the second RF signal in the second frequency segment.

12. The communication device of claim 11, wherein the one or more IC devices are configured to:
   generate the first A-MPDU to include the first information bit stream corresponding to a first A-MPDU length, and
   generate the second A-MPDU to include the second information bit stream corresponding to a second A-MPDU length.

13. The communication device of claim 12, wherein the one or more integrated circuits are configured to:
   generate the first information bit stream to include a first number of bits determined based on a first data rate at which the first A-MPDU is to be transmitted in the first frequency segment, and
   generate the second information bit stream to include a second number of bits determined based on a second data rate at which the second A-MPDU is to be transmitted in the second frequency segment.

14. The communication device of claim 12, wherein the one or more IC devices are configured to:
   encode, with the first transmit processor, the first information bit stream corresponding to the first A-MPDU using a first coding rate, and
   encode, with the second transmit processor, the second information bit stream corresponding to the second A-MPDU using a second coding rate different from the first coding rate.

15. The communication device of claim 12, wherein the one or more IC devices are configured to:
   modulate, with the first transmit processor, the first information bit stream of the first A-MPDU according to a first modulation scheme, and
   modulate, with the second transmit processor, the second information bit stream of the second A-MPDU according to a second modulation scheme different from the first modulation scheme.

16. The communication device of claim 12, wherein the one or more IC devices are configured to:
   parse, with the first transmit processor, the first information bit stream of the first A-MPDU to a first number of spatial streams, and
   parse, with the second transmit processor, the second information bit stream of the second A-MPDU to a second number of spatial streams different from the first number of spatial streams.

17. The communication device of claim 11, wherein the one or more IC devices are configured to generate the plurality of PPDUs to correspond to a single user (SU) transmission to a single communication device.

18. The communication device of claim 11, wherein the one or more IC devices are configured to generate the plurality of PPDUs to correspond to a multi-user (MU) transmission to multiple communication devices.

19. The communication device of claim 11, wherein the one or more IC devices are configured to transmit the first RF signal in the first frequency segment synchronously with transmitting the second RF signal in the second frequency segment.

20. The communication device of claim 11, wherein the one or more IC devices are configured to transmit the first RF signal in the first frequency segment asynchronously with transmitting the second RF signal in the second frequency segment.

* * * * *